United States Patent [19]
Astheimer

[11] 3,869,016
[45] Mar. 4, 1975

[54] REAR AXLE SUSPENSIONS FOR MOTOR VEHICLES

[75] Inventor: Karl Astheimer, Bischofsheim, Germany

[73] Assignee: General Motors Corporation, Detroit, Mich.

[22] Filed: Mar. 29, 1973

[21] Appl. No.: 346,131

[30] Foreign Application Priority Data
Apr. 20, 1972 Germany.............................. 2219318

[52] U.S. Cl..................... 180/73 R, 293/30, 293/63
[51] Int. Cl............................................. B60r 19/00
[58] Field of Search........... 180/73 R, 82 R; 293/30, 293/63, DIG. 3; 188/1 C

[56] References Cited
UNITED STATES PATENTS

| | | | |
|---|---|---|---|
| 3,026,972 | 3/1962 | Hendry | 188/1 C |
| 3,162,479 | 12/1964 | Hewitt | 180/82 R |
| 3,175,836 | 3/1965 | Mather | 180/73 R X |
| 3,333,880 | 8/1967 | Tavano | 293/30 |
| 3,511,345 | 5/1970 | Takamatsu | 293/DIG. 3 |
| 3,697,108 | 2/1971 | Diener | 188/1 C X |

Primary Examiner—David Schonberg
Assistant Examiner—Terrance L. Siemens
Attorney, Agent, or Firm—S. Schwartz

[57] ABSTRACT

A suspension for a driven rear axle of a motor vehicle is such that the rear axle is guided by generally longitudinally extending control arms which are pivotally connected to a vehicle body having a drive line which is able to transmit to the rear axle such displacement forces as may be imposed on the vehicle engine in the event of frontal impact of the vehicle. The control arms are made axially deformable to provide conversion of kinetic energy into deformation work, and/or the pivotal mountings for the control arms at the vehicle body are arranged to be displaceable, for example by tearing away from the vehicle body, to provide conversion of kinetic energy into deformation work in the event of frontal impact of the vehicle.

The suspension is primarily applicable to a rigid rear axle construction. The control arms will generally be trailing arms, but may be pusher arms.

8 Claims, 8 Drawing Figures

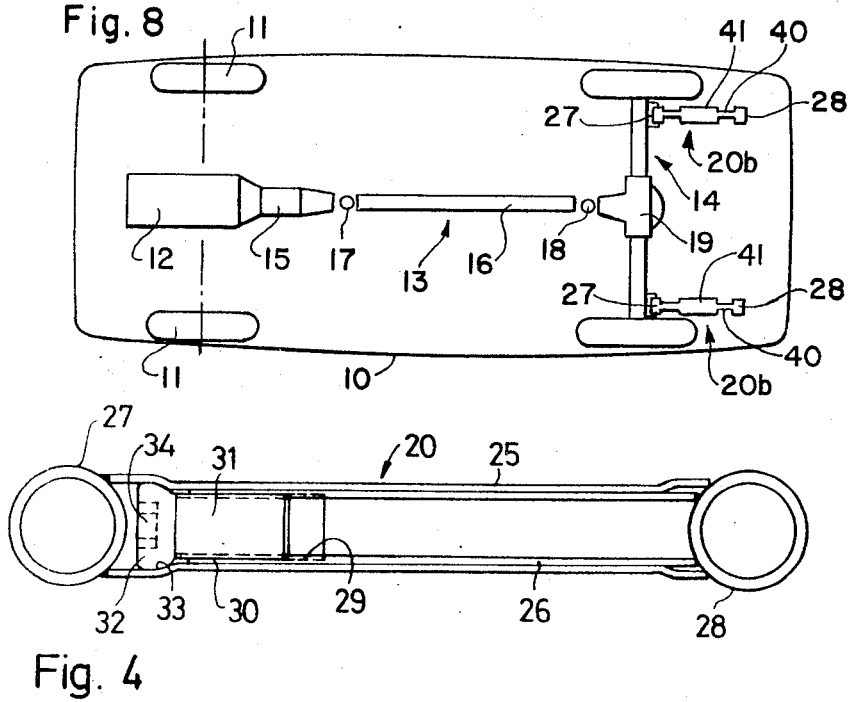
Fig. 8
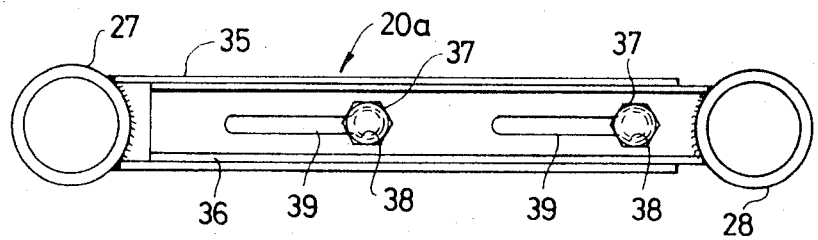
Fig. 4
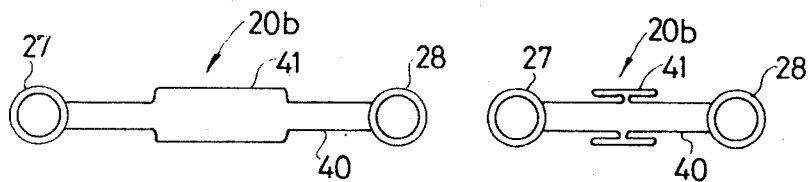
Fig. 5
Fig. 6          Fig. 7

REAR AXLE SUSPENSIONS FOR MOTOR VEHICLES

This invention relates to rear axle suspensions for motor vehicles, particularly passenger cars, in which the wheels are guided by longitudinal control arms pivotally connected to the vehicle body, the vehicle having a closed drive line which is able to transmit to the rear axle frontal forces acting from outside on a forward-placed engine of the vehicle. In the past, engineers have experimented with the idea of making the forward section of passenger vehicles deformable as a so-called crumpling zone in such a way that, in the event of a frontal collision, impact energy acting on the vehicle is converted into deformation work. Thus it is desirable to convert the greatest possible amount of the kinetic energy of the vehicle into deformation work, that is to allow the kinetic energy to be "absorbed" by vehicle parts not directly enclosing the occupants, but hitherto the amount of energy which could be converted or "absorbed" has been limited by the fact that, in the case of frontal collisions, only the forward section of the vehicle could be made use of for energy conversion ("energy absorption").

It is now proposed to bring further parts of the vehicle, which have hitherto remained undeformed, into the energy-conversion process so that, in the event of a frontal collision, the "absorbable" proportion of the total kinetic energy of the vehicle may be increased. In a vehicle of the kind referred to, this is to be achieved in accordance with the invention by arranging that the longitudinal control arms are made axially deformable whilst converting kinetic energy into deformation work, when under a predetermined loading greater than the normal braking and driving forces, and/or by arranging that their articulation points at the vehicle body are displaceable with respect to the latter in correspondingly energy-consuming manner.

Since the engine, propeller shaft and rear axle in practice lie virtually in a straight line, impact of the engine normally gives rise to very high deceleration values of the vehicle body via the articulation points of the rear axle, until the drive line becomes buckled. At the same time, the central bearing further stiffens the propeller shaft, since it shortens the latter's free length. By the invention, however, the vehicle body is permitted to move further forwards in energy-consuming manner relative to its suspension points at the longitudinal control arms or at the rear axle casing, so that the high deceleration peaks are reduced. Thus, in the event of a frontal impact, the vehicle is not merely deformed at the front, whilst pushing back the rear of the vehicle with full energy, but rather the rear axle is forced back in energy-consuming manner.

The longitudinal control arms must transmit the normal driving and braking moments, and fulfil their function of guiding the rear axle. Only after the forces required for these purposes have been exceeded may the energy-consuming deformation of the longitudinal control arms or of the suspension points commence.

Seeing that with the usual rear axle suspensions, the articulation points at the vehicle body lie in front of the rear axle, a preferred embodiment of the invention is one in which the longitudinal control arms are made withdrawable from each other in axial direction in energy-consuming manner. In conformity with a further feature of the invention, this can be achieved by arranging that each longitudinal control arm consists of two mutually telescopic parts, each of which is connected by one of its ends to one of the hinge eyes of the longitudinal control arm, and that the free end of the inner control arm part is provided with a thickening whose dimensions exceed the free bore diameter of the outer control arm part, the outer control arm part being correspondingly widened or flared at the place at which the thickening is located when in its normal position.

With the thickening enclosed by the corresponding flared or widened portion, the two parts of the longitudinal control arm are held together, without relative axial displacement under normal conditions. However, when tensile forces greater than the normal braking and driving forces are developed, the outer part is expanded by the thickened inner part whilst consuming energy, the outer part of the longitudinal control arm being made hollow. The inner part on the other hand may be of rod-shaped construction, but due to weight considerations (important for unsprung masses) a hollow construction of the longitudinal control arm parts is preferred. Basically, the cross-section of the inner part and outer part may be of any configuration, but from the aspect of production and operation it is preferable for mutually telescoping tubes of circular cross-section to serve as control arm parts, and for the thickening of the inner control parts to be of spherical shape. For example, the thickening may be created by a corresponding expansion of the free end of the tube of the inner control arm, this presupposing that the latter has a greater strength. Alternatively a solid spherical head could be welded on to the respective end of the tube. It is however preferred for the thickening to comprise the spherical head of a bolt screwed into the free end of the inner tubular control arm part, and to provide the spherical head of the bolt with an internal hexagon for the screwing-up operation. In a simple and advantageous manner, an accurate adjustment of the length of the control arm in the normal position is thereby made possible.

In another embodiment in conformity with the invention, which is an alternative to the above-described design and construction of the control arms, it is proposed that each control arm should consist of two parts pushed into one another, each of which is secured by one of its ends to one of the two hinge eyes of the control arm, and that the control arm parts should have corresponding transverse bores which are penetrated by attachment bolts, and that one bore of each two transverse bores penetrated by an attachment bolt should run out into a longitudinal slot whose width is less than the diameter of the transverse bores, and less than the diameter of the corresponding bolts.

When tensile forces develop, the longitudinal slots are expanded by the attachment bolts, with consumption of energy. The longitudinal slots may be provided either in the outer control arm part or in the inner one; alternatively, for one pair of corresponding bores the slots may be provided in the outer control arm, and for another pair of bores they may be provided in the inner control arm. In order to avoid apertures at the outer control arm part, which are liable to allow moisture and dirt to penetrate between the two control arm parts, it is preferred for the transverse bores of the inner control arm part to be the ones which run out into the longitudinal slots.

Here again, in principle, the choice of suitable cross-sections for the longitudinal control arm parts may be left to the technical expert. For reasons of cost and production, however, it is preferred to employ mutually telescoping U-section members as control arm parts, and to use screw bolts secured by nuts as attachment means.

The foregoing statements relating to specific embodiments have been concerned with control arms which can be drawn apart whilst consuming energy, but it is within the scope of the invention to design them so that under certain conditions they are longitudinally collapsible. These conditions would exist for example — although rather unusual in practice — if the articulation points of the control arms at the vehicle body were to lie behind the rear axle.

In detail, the principle of energy-consuming collapsible control arms could be realised in practice by arranging that, between the hinge eyes, the control arms are of tubular shape, preferably of circular cross-section but in their central region the cross-section is widened. At supercritical compressive stress, the control arm parts of smaller cross-section would then move axially towards each other, under an expedient deformation of the widened region, whilst the total length of the control arm would be decreased. According to a further proposal in conformity with the invention, this effect can be achieved in particularly favourable manner by arranging for the transition (or each transition) from the smaller cross-section into the widened cross-section of the central region of each control member to take place abruptly, that is by a single abrupt step.

The invention is intended chiefly for rigid rear axle constructions. Nevertheless, the principle may also be applied to an independently sprung axle. In this case it is expedient to arrange for the suspension brackets of the control arms to be secured to the floor sheeting or to the vehicle side members in such a way that, under a certain loading greater than the normal braking and driving forces, the control arms are torn out of the floor sheeting or side members, as the case may be.

A prerequisite for the satisfactory functioning of the rear axle suspension in accordance with the invention is that in every case, once the engine has struck against an obstacle in the event of a collision, the rear axle is forced back to a greater or lesser extent by the power unit and the propeller shaft.

The appended claims define the scope of the invention claimed. The invention and how it can be performed are hereinafter particularly described with reference to the accompanying drawings, in which:

FIG. 4 is a longitudinal section of one embodiment of a control arm in conformity with the invention;

FIG. 5 is a longitudinal section of another embodiment of a control arm in conformity with the invention;

FIG. 6 is a schematic side elevation of a further embodiment of a control arm in conformity with the invention;

Figure 1:
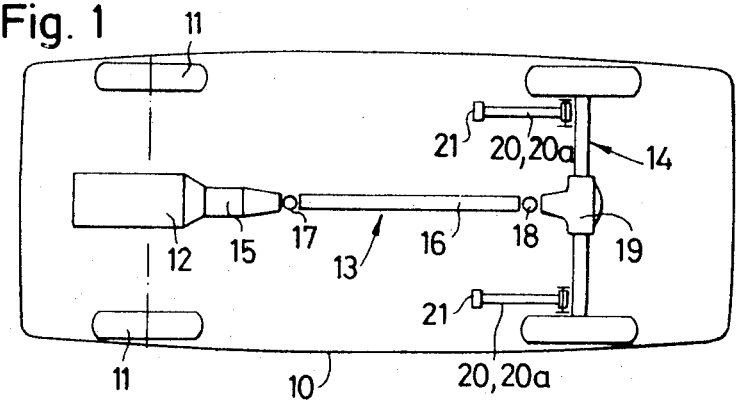
FIG. 1 is a view from below of a passenger vehicle having features in accordance with the invention.
Figure 2:
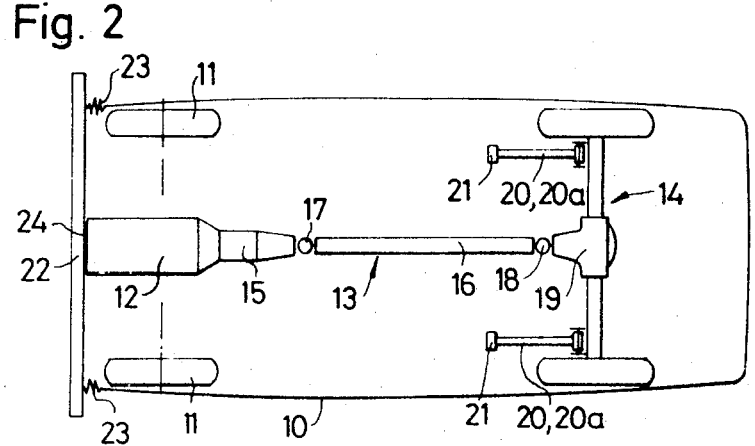
FIG. 2 is a view similar to FIG. 1, after the vehicle has collided with the obstacle as far as its engine.
Figure 3:
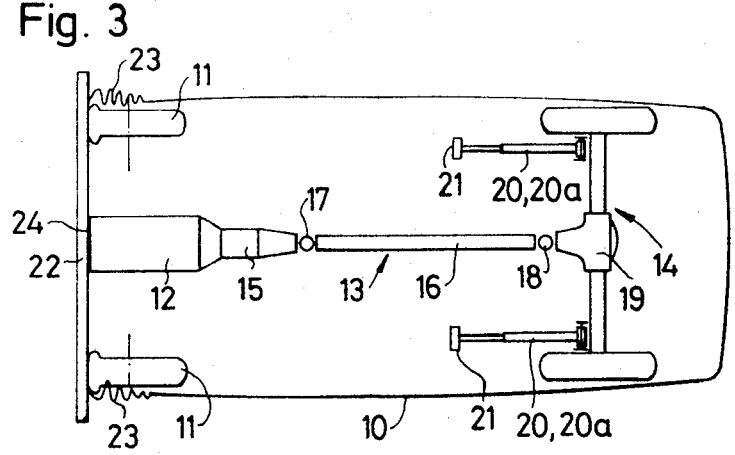
FIG. 3 is a view again similar to FIG. 1 but in this case showing the vehicle at a moment somewhat later than the initial commencement of the collision situation shown in FIG. 2.

FIG. 7 is a similar showing the control arm of FIG. 6 after plastic deformation; and FIG. 8 is a view similar to FIG. 1 but showing a modified embodiment of the invention. In FIGS. 1 to 3 of the drawings, reference numeral 10 denotes the vehicle body, 11 the two front wheels, 12 the engine, 13 the drive line and 14 the rear axle of a passenger vehicle. The drive line 13 is of conventional construction, consisting of a change-speed gear 15, a propeller shaft 16 with two universal joints 17, 18 and a differential gear 19. The rear axle 14 is designed as a rigid axle and is guided by two longitudinal control arms 20, 20a which are hingedly connected at their front ends 21 to the vehicle body 10.

In the view shown in FIG. 2, the vehicle (shown still undamaged in FIG. 1) is assumed to be in frontal impact with an obstacle 22. Here, with kinetic energy converted into deformation work, the front portion 23 of the vehicle body 10 suffers plastic deformation until the engine 12 comes to rest with its front face 24 against the obstacle 22. So far, the rear axle 14, 20 is still unchanged.

The view shown in FIG. 3 shows the vehicle crashed on the obstacle 22, as it is at a somewhat later instant, or alternatively its situation after an impact more severe than in FIG. 2. Here the body 10 has been pushed further forward relative to the rear axle 14, which is firmly held by the engine 12 and the drive line 13. The resulting tensile forces exerted by the vehicle body 10 on the longitudinal control arms 20, 20a via the joints 21 have brought about an elongation of these control arms 20, 20a. During this operation, a further portion of the kinetic energy of the vehicle has been converted by the longitudinal control arms 20 into deformation work.

FIG. 4 illustrates an embodiment of such an energy-consuming longitudinal control arm 20. It consists of two tubular parts 25 and 26, each having one of its ends welded to a respective hinge eye 27 and 28. The hinge eyes 27 and 28 form hinge connections to the rear axle 14 and to the mounting 21 on the vehicle body 10 (FIGS. 1 to 3). As will be further apparent from FIG. 4, the two tubular longitudinal control arms 25 and 26 are completely telescoped into each other when in the normal position indicated, and are held in this relative position by means of a bolt 31 screwed into a thread 29 at the free end 30 of the inner control member part 26. The bolt 31 is provided with a spherical head 32 which is mounted in a corresponding flared enlargement 33 at one end of the outer control arm 25, so that the inner control arm 26 supports itself at this enlargement 33. To facilitate screwing up the bolt 31, the spherical head 32 is provided with an internal hexagon 34.

The mode of operation of the longitudinal control arm 20 shown in FIG. 4 is that when tensile forces greater than the normal braking and driving forces arise, the bolt 31 which is provided with a spherical head 32 and is connected to the hinge eye 28 through the inner tube 26 causes the outer tube 25 connected to the other hinge eye 27 to become expanded, thereby consuming energy.

Another embodiment of an energy-consuming control arm — here designated by 20a — is shown in FIG. 5. Like the embodiment shown in FIG. 4, two control arm parts 35 and 36 each connected by welding to a hinge eye 27 and 28 respectively are arranged telescoped into each other. Here however, U-profile sections are used instead of tubular parts. In their normal position, indicated in FIG. 5, the two control arm parts 35 and 36 are fixed by two attachment bolts 37 which pass through corresponding holes 38 in the two control arm parts 35, 36. The profile section 35 connected to the eye 27 has a single passage hole in each case for the attachment bolt 37, but the profile section 36 connected to the eye 28 is provided with a slot 39 running into the passage hole 38 in each case. Thereby, when tensile forces arise, the slots 39 are widened by the attachment bolts 37 with consumption of energy.

FIGS. 6 and 7 show a longitudinal control arm 20b which is plastically deformable in energy-consuming manner by axial compressive stress. In contrast to the above-described embodiment shown in FIGS. 4 and 5, the control arm 20b consists of a single tubular part 40 connected at its ends to hinge eyes 27 and 28 which are similar to those shown in FIGS. 4 and 5 and are therefore identified correspondingly. In its central region the tubular portion 40 has an enlarged cross-section, with the transitions from the smaller tube cross-sections to the larger one brought about by respective shouldered formations. If the control arm 20b is stressed by an axial compressive force which is greater than the normal braking and driving forces, it assumes the shape shown in FIG. 7. Here, with a consumption of kinetic energy and a corresponding shortening of the longitudinal control arm 20b, the regions of smaller cross-section of the tubular part 40 are pushed into the widened central region 41.

What is claimed is:

1. A motor vehicle having a body, an engine mounted in a front portion of the vehicle body, a rear axle, a transverse pair of pivotal link assemblies forming guide means for the rear axle and each comprising a control arm that extends in a direction generally longitudinally of the vehicle and has at respective ends thereof a connection to the rear axle and a pivotal mounting to the vehicle body, and a closed drive line interconnecting the engine and the rear axle of the vehicle and arranged, in the event of rearward displacement of the engine due to frontal impact of the vehicle, to transmit a rearwardly directed force to the rear axle, the pivotal link assemblies being designed, in response to a predetermined loading in excess of that occurring under normal braking and driving conditions of the vehicle, to yield and permit rearward displacement of the rear axle, with conversion of kinetic energy into deformation work by the pivotal link assemblies.

2. A motor vehicle having a body, an engine mounted in a front portion of the vehicle body, a rear axle, a transverse pair of pivotal link assemblies forming guide means for the rear axle and each comprising a control arm that extends in a direction generally longitudinally of the vehicle and has at a rear end thereof a connection to the rear axle and at a front end thereof a pivotal mounting to the vehicle body, such that the pivotal mountings are disposed forwardly of the rear axle, and a closed drive line interconnecting the engine and the rear axle of the vehicle and arranged, in the event of rearward displacement of the engine due to frontal impact of the vehicle, to transmit a rearwardly directed force to the rear axle, the control arms of the pivotal link assemblies being constructed to be telescopically extensible in response to a predetermined loading in excess of that occurring under normal braking and driving conditions of the vehicle, and thereby to permit rearward displacement of the rear axle, with conversion of kinetic energy into deformation work by the telescopic extension of the control arms.

3. A motor vehicle having a body, an engine mounted in a front portion of the vehicle body, a rigid rear axle, a transverse pair of pivotal link assemblies forming guide means for the rear axle and each comprising a control arm that extends in a direction generally longitudinally of the vehicle and has at a rear end thereof a connection to the rear axle and at a front end thereof a pivotal mounting to the vehicle body, such that the pivotal mountings are disposed forwardly of the rear axle, and a closed drive line interconnecting the engine and the rear axle of the vehicle and arranged, in the event of rearward displacement of the engine due to frontal impact of the vehicle, to transmit a rearwardly directed force to the rear axle, the control arms of the pivotal link assemblies being constructed to be telescopically extensible in response to a predetermined loading in excess of that occurring under normal braking and driving conditions of the vehicle, and thereby to permit rearward displacement of the rear axle, with conversion of kinetic energy into deformation work by the telescopic extension of the control arms, in that each of the control arms comprises two mutually telescopic parts provided with hinge eyes at their axially outer ends, the axially inner end of the radially inner telescopic part being formed with an enlargement which is accommodated in a widened portion of a hollow interior of the radially outer telescopic part, the enlargement having a larger dimension in the radial direction of the telescopic parts than the remainder of the hollow interior of the radially outer telescopic part in the direction corresponding to telescopic extension of the parts.

4. A motor vehicle according to claim 3, in which the two mutually telescopic parts of each control arm have a circular cross-section, and the enlargement of the radially inner telescopic part comprises a generally spherically shaped head of a bolt that is screwed into a hollow interior of the axially inner end of the radially inner telescopic part, for which purpose the spherically shaped head is formed with a hexagonal recess.

5. A motor vehicle having a body, an engine mounted in a front portion of the vehicle body, a rear axle, a transverse pair of pivotal link assemblies forming guide means for the rear axle and each comprising a control arm that extends in a direction generally longitudinally of the vehicle and has at a rear end thereof a connection to the rear axle and at a front end thereof a pivotal mounting to the vehicle body, such that the pivotal mountings are disposed forwardly of the rear axle, and a closed drive line interconnecting the engine and the rear axle of the vehicle and arranged, in the event of rearward displacement of the engine due to frontal impact of the vehicle, to transmit a rearwardly directed force to the rear axle, the control arms of the pivotal link assemblies being constructed to be telescopically extensible in response to a predetermined loading in excess of that occurring under normal braking and driving conditions of the vehicle, and thereby to permit rearward displacemennt of the rear axle, with conversion of kinetic energy into deformation work by the telescopic extension of the control arms, in that each of the control arms comprises two mutually telescopic parts provided with hinge eyes at their axially outer ends, the said parts being formed with transverse bores accommodating securing bolts, and one of the transverse bores for each securing bolt runs out, in the direction corresponding to telescopic extension of the parts, into a longitudinally extending slot of lesser width than the diameter of the transverse bores.

6. A motor vehicle having a body, an engine mounted in a front portion of the vehicle body, a rigid rear axle, a transverse pair of pivotal link assemblies forming guide means for the rear axle and each comprising a control arm that extends in a direction generally longitudinally of the vehicle and has at a rear end thereof a connection to the rear axle and at a front end thereof a pivotal mounting to the vehicle body, such that the pivotal mountings are disposed forwardly of the rear axle, and a closed drive line interconnecting the engine and the rear axle of the vehicle and arranged, in the event of rearward displacement of the engine due to frontal impact of the vehicle, to transmit a rearwardly directed force to the rear axle, the control arms of the pivotal link assemblies being constructed to be telescopically extensible in response to a predetermined loading in excess of that occurring under normal braking and driving conditions of the vehicle, and thereby to permit rearward displacement of the rear axle, with conversion of kinetic energy into deformation work by the telescopic extension of the control arms, in that each of the control arms comprises two mutually telescopic parts which have a U-shaped cross-section and are provided with hinge eyes at their axially outer ends, the said parts being formed with transverse bores accommodating screw bolts retained by nuts, and the bores which are formed in the inner telescopic part of each control arm run out, in the direction corresponding to telescopic extension of the parts, into respective longitudinally extending slots which are of lesser width than the diameter of the transverse bores and of lesser width than the diameter of the respective bolts.

7. A motor vehicle having a body, an engine mounted in a front portion of the vehicle body, a rigid rear axle, a transverse pair of pivotal link assemblies forming guide means for the rear axle and each comprising a control arm that extends in a direction generally longitudinally of the vehicle and has at a front end thereof a connection to the rear axle and at a rear end thereof a pivotal mounting to the vehicle body, such that the pivotal mountings are disposed rearwardly of the rear axle, and a closed drive line interconnecting the engine and the rear axle of the vehicle and arranged, in the event of rearward displacement of the engine due to frontal impact of the vehicle, to transmit a rearwardly directed force to the rear axle, the control arms of the pivotal link assemblies being constructed to be longitudinally collapsible in response to a predetermined loading in excess of that occurring under normal braking and driving conditions of the vehicle, and thereby to permit rearward displacement of the rear axle, in that the control arms are provided at opposite ends thereof with hinge eyes between which the control arms are of hollow circular cross-section with at least one abrupt change in the cross-sectional diameter in the central region of each control arm, such that the control arms are longitudinally collapsible in response to the said predetermined loading with conversion of kinetic energy into deformation work.

8. A motor vehicle having a body, an engine mounted in a front portion of the vehicle body, a rear axle, a transverse pair of pivotal link assemblies forming guide means for the rear axle and each comprising a control arm that extends in a direction generally longitudinally of the vehicle and has at respective ends thereof a connection to the rear axle and a pivotal mounting to the vehicle body, and a closed drive line interconnecting the engine and the rear axle of the vehicle and arranged, in the event of rearward displacement of the engine due to frontal impact of the vehicle, to transmit a rearwardly directed force to the rear axle, the pivotal mountings for the control arms to the vehicle body being secured in such a way that, in response to a predetermined loading in excess of that occurring under normal braking and driving conditions of the vehicle, the mountings are torn away from the vehicle body, with conversion of kinetic energy into deformation work.

* * * * *